US011978879B1

(12) United States Patent
Ma et al.

(10) Patent No.: US 11,978,879 B1
(45) Date of Patent: May 7, 2024

(54) DEVIATION-CORRECTING METHOD AND APPARATUS FOR DOUBLE-SIDED COATING

(71) Applicant: CONTEMPORARY AMPEREX TECHNOLOGY CO., LIMITED, Ningde (CN)

(72) Inventors: Yunfei Ma, Ningde (CN); Tao Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/405,420

(22) Filed: Jan. 5, 2024

Related U.S. Application Data

(63) Continuation of application No. PCT/CN2022/074719, filed on Jan. 28, 2022.

(51) Int. Cl.
H01M 4/04 (2006.01)
(52) U.S. Cl.
CPC .................. *H01M 4/0404* (2013.01)
(58) Field of Classification Search
CPC .................................................. H01M 4/0404
See application file for complete search history.

(56) References Cited

FOREIGN PATENT DOCUMENTS

| CN | 209287633 U | 8/2019 |
|---|---|---|
| CN | 111416142 A | 7/2020 |
| CN | 112571154 A | 3/2021 |
| CN | 112916327 A | 6/2021 |
| CN | 214243120 U | 9/2021 |
| JP | 2002093408 A | 3/2002 |

OTHER PUBLICATIONS

International Search Report for International Application PCT/CN2022/074719, dated Sep. 27, 2022.
Written Opinion of International Search Authority for International Application PCT/CN2022/074719, dated Sep. 27, 2022.

*Primary Examiner* — Sarah A. Slifka
(74) *Attorney, Agent, or Firm* — Ladas & Parry LLP

(57) ABSTRACT

The present application provides a deviation-correcting method and apparatus for double-sided coating, and relates to the technical field of manufacturing of batteries. The method includes: acquiring a first distance between an edge of a coating area on a first surface of an electrode plate substrate and an edge of the electrode plate substrate from a deviation-correcting cross section; acquiring a second distance between an edge of a coating area on a second surface of the electrode plate substrate and the edge of the electrode plate substrate from the deviation-correcting cross section; determining edge deviation information of the coating areas; determining a first deviation-adjusting range; and in a case that a first intersection is present in the first deviation-correcting range, determining a deviation-correcting quantity of the electrode plate substrate. According to the method, the problem of the deviation of the coating areas in the coating process can be improved.

13 Claims, 4 Drawing Sheets

US 11,978,879 B1

DEVIATION-CORRECTING METHOD AND APPARATUS FOR DOUBLE-SIDED COATING

CROSS REFERENCE TO RELATED APPLICATION

This application is a continuation of International Patent Application No. PCT/CN2022/074719, filed on Jan. 28, 2022, which is incorporated by reference in its entirety.

TECHNICAL FIELD

The present application relates to the technical field of manufacturing of batteries, and in particular, to a deviation-correcting method and apparatus for double-sided coating.

BACKGROUND

Energy saving and emission reduction is the key to the sustainable development of automobile industry. Electric vehicles have become an important part of the sustainable development of the automobile industry due to their advantages of energy saving and environmental protection. For electrical vehicles, the battery manufacturing technology is an important factor related to the development.

In the production and manufacturing of batteries, a coating process is a crucial link. In the coating process, due to the nozzle pressure of a coating die head, the coating results will have deviation, thereby affecting the safety performance of batteries.

SUMMARY

In view of the above problem, the present application provides a deviation-correcting method and apparatus for double-sided coating, which can improve the problem of the deviation of coating areas in the coating process.

A first aspect of the present application provides a deviation-correcting method for double-sided coating. The method includes: acquiring a first distance between an edge of a coating area on a first surface of an electrode plate substrate and an edge of the electrode plate substrate from a deviation-correcting cross section, where the deviation-correcting cross section is perpendicular to a plane of the electrode plate substrate in a width direction of the electrode plate substrate; acquiring a second distance between an edge of a coating area on a second surface of the electrode plate substrate and the edge of the electrode plate substrate from the deviation-correcting cross section, where the edge of the coating area on the second surface is in one-to-one correspondence with the edge of the coating area on the first surface; determining edge deviation information of the coating areas according to the first distance and the second distance; determining a first deviation-adjusting range according to the edge deviation information of the coating areas and a first deviation-correcting range; and in a case that a first intersection is present in the first deviation-adjusting range, determining a deviation-correcting quantity of the electrode plate substrate according to the first intersection.

In the embodiments of the present application, the deviation-correcting quantity of the electrode plate substrate determined by the intersection of the deviation-adjusting range can make the edge deviation information of the coating areas meet the standard requirement after deviation-correcting adjustment.

In some possible embodiments, the in a case that a first intersection is present in the first deviation-adjusting range, determining a deviation-correcting quantity of the electrode plate substrate according to the first intersection includes: in a case that an intersection is not present in the first deviation-adjusting range, determining a second deviation-adjusting range according to the deviation information of the edges of the coating areas and a second deviation-correcting range; and in a case that a second intersection is present in the second deviation-adjusting range, determining a deviation-correcting quantity of the electrode plate substrate according to the second intersection, where the second deviation-correcting range is larger than the first deviation-correcting range.

In the embodiments of the present application, in a case that an intersection is not present in a first deviation-adjusting range, a deviation-correcting quantity of the electrode plate substrate is determined according to a second intersection, so that a misalignment quantity between the first distance and the second distance can be reduced.

In some possible embodiments, the determining a deviation-correcting quantity of the electrode plate substrate according to the first intersection includes: determining first deviation information according to the edge deviation information of the coating area, where the first deviation information includes a first deviation quantity and a first average deviation quantity; determining second deviation information according to the edge deviation information of the coating areas and an alternative deviation-correcting quantity, where the alternative deviation-correcting quantity meets the intersection of the deviation-adjusting range, and the second deviation information includes a second deviation quantity and a second average deviation quantity; and determining the deviation-correcting quantity of the electrode plate substrate according to the first deviation information and the second deviation information.

In the embodiments of the present application, the deviation-correcting quantity of the electrode plate substrate is determined according to the first deviation information and the second deviation information, so that the deviation-correcting result can be further optimized.

In some possible embodiments, the determining a deviation-correcting quantity of the electrode plate substrate according to the first intersection includes: determining a deviation quantity between the first distance and the second distance according to the edge deviation information of the coating areas and the deviation-correcting quantity of the electrode plate substrate: and in a case that the deviation quantity between the first distance and the second distance meets the first deviation-correcting range, determining the deviation-correcting quantity of the electrode plate substrate as the deviation-correcting quantity.

In the embodiments of the present application, after the electrode plate substrate is adjusted through the determined deviation-correcting quantity, the deviation quantity between the first distance and the second distance of the coating areas may meet the standard-allowable deviation range.

In some possible embodiments, the determining the deviation-correcting quantity of the electrode plate substrate according to the first deviation information and the second deviation information includes:

in a case that the first deviation information and the second deviation information meet one or more of the following preset conditions:

the second deviation quantity is less than the first deviation quantity, and the second average deviation quantity is less than the first average deviation quantity;

the second deviation quantity is less than or equal to the first deviation quantity, and the second average deviation quantity is less than the first average deviation quantity; and the second deviation quantity is less than the first deviation quantity, and the second average deviation quantity is less than or equal to the first average deviation quantity, determining the deviation-correcting quantity of the electrode plate substrate according to the first deviation information and the second deviation information.

In the embodiments of the present application, the preset conditions are set, so that it may be determined whether the deviation-correcting results of the alternative deviation-correcting quantity that meets the intersection of the deviation-adjusting range are improved, and the deviation-correcting quantity with the good deviation-correcting result is selected therefrom.

In some possible embodiments, the determining a first deviation-adjusting range according to the edge deviation information of the coating areas and a first deviation-correcting range includes: in a case that the edge deviation information of the coating areas does not meet the first deviation-correcting range, determining the first deviation-adjusting range according to the edge deviation information of the coating areas and the first deviation-correcting range.

In the embodiments of the present application, in a case that the edge deviation information of the coating areas does not meet the first deviation-correcting range, it is considered that the deviation quantity between the first distance and the second distance exceeds the standard-allowable range, so it is necessary to perform deviation-correcting adjustment on the electrode plate substrate.

A second aspect of the present application provides a deviation-correcting apparatus for double-sided coating. The apparatus includes: an acquisition module, configured to: acquire a first distance between an edge of a coating area on a first surface of an electrode plate substrate and an edge of the electrode plate substrate from a deviation-correcting cross section, where the deviation-correcting cross section is perpendicular to a plane of the electrode plate substrate in a width direction of the electrode plate substrate, and acquire a second distance between an edge of a coating area on a second surface of the electrode plate substrate and the edge of the electrode plate substrate from the deviation-correcting cross section, where the edge of the coating area on the second surface is in one-to-one correspondence with the edge of the coating area on the first surface; a processing module, configured to: determine edge deviation information of the coating areas according to the first distance and the second distance, determine a first deviation-adjusting range according to the edge deviation information of the coating areas and a first deviation-correcting range, and in a case that a first intersection is present in the first deviation-adjusting range, determine a deviation-correcting quantity of the electrode plate substrate according to the first intersection; and a control module, configured to control a deviation-correcting distance of the electrode plate substrate according to the deviation-correcting quantity of the electrode plate substrate.

In the embodiments of the present application, the deviation-correcting quantity of the electrode plate substrate determined by the processing module through the intersection of the deviation-adjusting range can make the edge deviation information of the coating areas meet the standard requirement after deviation-correcting adjustment by the control module.

In some possible embodiments, the processing module is configured to: in a case that a first intersection is present in the first deviation-adjusting range, determine a deviation-correcting quantity of the electrode plate substrate according to the first intersection, including: the processing module is configured to: in a case that an intersection is not present in the first deviation-adjusting range, determine a second deviation-adjusting range according to the deviation information of the edges of the coating areas and a second deviation-correcting range; and in a case that a second intersection is present in the second deviation-adjusting range, determine a deviation-correcting quantity of the electrode plate substrate according to the second intersection, where the second deviation-correcting range is larger than the first deviation-correcting range.

In the embodiments of the present application, in a case that an intersection is not present in a first deviation-adjusting range, the processing module determines a deviation-correcting quantity of the electrode plate substrate according to a second intersection, so that a misalignment quantity between the first distance and the second distance can be reduced.

In some possible embodiments, the processing module is configured to: determine a deviation-correcting quantity of the electrode plate substrate according to the first intersection, including: the processing module is further configured to: determine first deviation information according to the edge deviation information of the coating area, where the first deviation information includes a first deviation quantity and a first average deviation quantity; determine second deviation information according to the edge deviation information of the coating areas and an alternative deviation-correcting quantity, where the alternative deviation-correcting quantity meets the intersection of the deviation-adjusting range, and the second deviation information includes a second deviation quantity and a second average deviation quantity; and determine the deviation-correcting quantity of the electrode plate substrate according to the first deviation information and the second deviation information.

In the embodiments of the present application, the processing module determines the deviation-correcting quantity of the electrode plate substrate according to the first deviation information and the second deviation information, so that the deviation-correcting result can be further optimized.

In some possible embodiments, the processing module is further configured to: determine a deviation-correcting quantity of the electrode plate substrate according to the first intersection, including: the processing module is configured to: determine a deviation quantity between the first distance and the second distance according to the edge deviation information of the coating areas and the deviation-correcting quantity of the electrode plate substrate; and in a case that the deviation quantity between the first distance and the second distance meets the first deviation-correcting range, determine the deviation-correcting quantity of the electrode plate substrate as the deviation-correcting quantity.

In the embodiments of the present application, after the electrode plate substrate is adjusted through the deviation-correcting quantity determined by the processing module, the deviation quantity between the first distance and the second distance of the coating areas may meet the standard-allowable deviation range.

In some possible embodiments, the processing module is further configured to: determine the deviation-correcting quantity of the electrode plate substrate according to the first deviation information and the second deviation information, including: in a case that the first deviation information and the second deviation information meet one or more of the following preset conditions: the second deviation quantity is less than the first deviation quantity, and the second average deviation quantity is less than the first average deviation quantity; the second deviation quantity is less than or equal to the first deviation quantity, and the second average deviation quantity is less than the first average deviation quantity; and the second deviation quantity is less than the first deviation quantity, and the second average deviation quantity is less than or equal to the first average deviation quantity, the processing module determines the deviation-correcting quantity of the electrode plate substrate according to the first deviation information and the second deviation information.

In the embodiments of the present application, the processing module sets the preset conditions, so that it may be determined whether the deviation-correcting results of the alternative deviation-correcting quantity that meets the intersection of the deviation-adjusting range are improved, and the deviation-correcting quantity with the good deviation-correcting result is selected therefrom.

In some possible embodiments, the processing module is further configured to: determine a first deviation-adjusting range according to the edge deviation information of the coating areas and a first deviation-correcting range, including: in a case that the edge deviation information of the coating areas does not meet the first deviation-correcting range, the processing module determines the first deviation-adjusting range according to the edge deviation information of the coating areas and the first deviation-correcting range.

In the embodiments of the present application, in a case that the edge deviation information of the coating areas does not meet the first deviation-correcting range, the processing module considers that the deviation quantity between the first distance and the second distance exceeds the standard-allowable range, so it is necessary to perform deviation-correcting adjustment on the electrode plate substrate.

A third aspect of the present application provides a reverse current control apparatus for a phase-shifting full-bridge circuit, including a memory and a processor, where the memory is configured to store an instruction; and the processor is configured to read the instruction and perform the method in any possible implementation manner of the first aspect and the second aspect based on the instruction.

A fourth aspect of the present application provides a deviation-correcting mechanism for double-sided coating, including the deviation-correcting apparatus for double-sided coating according to the second or third aspect.

A fifth aspect of the present invention provides a readable storage medium for storing a computer program, where the computer program is configured to perform the method according to the first aspect and any possible implementation manner of the first aspect.

DETAILED DESCRIPTION

Figure 1:
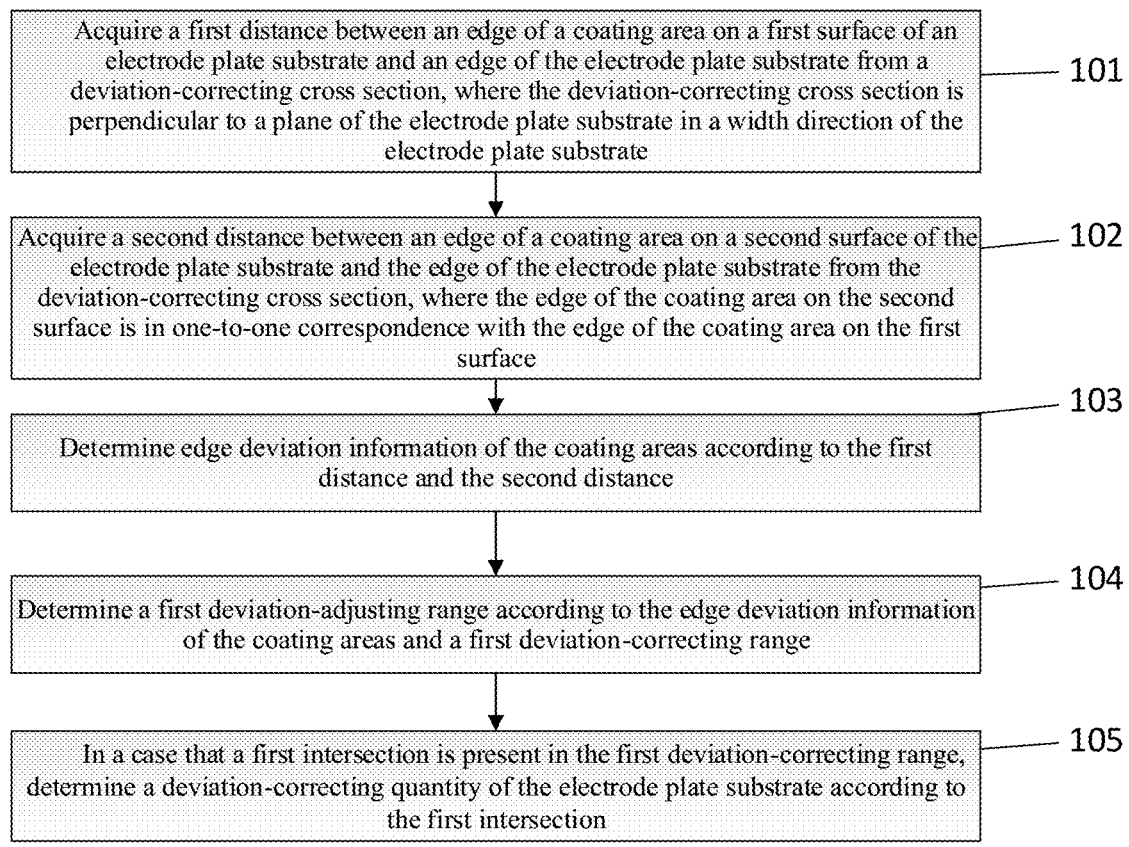
FIG. 1 is a schematic flowchart of a deviation-correcting method for double-sided coating according to an embodiment of the present application.

Embodiments of the technical solutions of this application will be described in detail below with reference to the accompanying drawings. The following embodiments are only used to more clearly describe the technical solutions of this application, and thus are merely exemplary and are not intended to limit the protection scope of this application.

Unless otherwise defined, all technical and scientific terms used in this specification have the same meanings as those generally understood by persons skilled in the technical field of this application. The terms used in this specification are only intended to describe the specific embodiments and are not intended to limit this application. The terms "comprising", "having" and any variations thereof in the description, the claims and the description of the accompanying drawings of this application are intended to cover non-exclusive inclusion.

In the description of the embodiment of this application, the technical terms "first", "second" and the like are used only for distinguishing different objects and cannot be interpreted as an indication or implication of relative importance or an implicit indication of the number, the specific order or the primary and secondary relationship of technical features. In the description of the embodiments of this application, "a plurality of" means two or more, unless otherwise specifically defined.

"Embodiment" mentioned herein means that the specific features, structures or characteristics described with reference to the embodiments may be included in at least one embodiment of this application. The phrase appearing at each position of the description does not necessarily indicate the same embodiment and it is not an exclusively independent or alternative embodiment of other embodiments. It is understood explicitly and implicitly by those skilled in the art that the embodiments described herein can be combined with other embodiments.

In the description of the embodiments of this application, the term "and/or" merely describes the association relationship between the associated objects and indicates that there may be three relationships. For example, A and/or B may indicate three cases where only A exists, A and B exist at the same time, or only B exists. In addition, the character "/" herein generally indicates that the associated objects are in an "or" relationship.

In the description of the embodiments of this application, the term "a plurality of" refers to more than two (including two). Similarly, "multiple groups" refers to more than two groups (including two groups), and "multiple pieces" refers to more than two pieces (including two pieces).

In the description of the embodiments of this application, a direction or a positional relationship indicated by technical terms "center", "longitudinal", "transverse", "length", "width", "thickness" "upper" "lower", "front", "rear", "left", "right", "vertical", "horizontal", "top", "bottom", "inner", "outer", "clockwise", "counterclockwise", "axial", "radial", "circumferential" and the like is based on that shown in the accompanying drawings, is merely to describe the embodiments of this application and simplify the description and does not indicate or imply that the indicated device or component must have a special direction or is constructed and operated in a special direction, and thus cannot be understood as a limit of this application.

In the description of the embodiments of this application, unless otherwise specified and limited, technical terms "mounting", "connecting", "connection", "fixing" and the like should be understood in a broad sense, for example, they may be fixed connection, or may be detachable connection or be integrated, or may be mechanical connection, or may be electric connection, or may be direct connection, or may be indirect connection through an intermediate medium, or may be communication between interiors of two components, or may be an interactive relationship between two components. A person of ordinary skill in the art may understand specific meanings of the above-mentioned terms in the embodiments of this application based on the specific situation.

At present, from the development of the market situation, the application of power batteries is more and more extensive. The power batteries are not only applied to energy-storing power supply systems such as hydropower, firepower, wind power and solar power stations, but also widely applied to electric vehicles such as electric bicycles, electric motorcycles and electric automobiles, and military equipment, aerospace and other fields. With the continuous expansion of the application fields of the power batteries, the market demand for the power batteries is also expanding. Therefore, improving the production process of the power batteries will directly affect the safety and stability of the batteries.

The inventor notices that in the production and manufacturing of batteries, a coating process is a crucial link. In the coating process, due to the nozzle pressure of a coating die head, the coating results of an electrode plate will have deviation. When the misalignment quantity between the front and back sides of the coating areas of the electrode plate exceeds a certain range, which is not found in time for deviation-correcting adjustment, the safety performance of the batteries will be affected seriously, and the rejection range of products will be increased seriously, thereby increasing the manufacturing cost.

Due to different production requirements, only one coating area or a plurality of coating areas may be present on the electrode plate. To improve the problem of coating deviation of the electrode plate, the applicant found through research that the problem of coating deviation can be improved by a control strategy. Specifically, the deviation quantity of the front and back sides of the coating areas is controlled within a qualified range by a deviation-correcting method.

In such a deviation-correcting method, the deviation quantity of the front and back sides of different coating areas can be considered, thereby effectively ensuring the production quality of the electrode plate.

The deviation-correcting method and apparatus for double-sided coating disclosed by the embodiments of the present application may be but not limited to the production and manufacturing of electrode plates in electric apparatuses such as vehicles, ships or aircrafts. A coating device formed by the deviation-correcting method and apparatus for double-sided coating disclosed by the embodiments of the present application may be used, so that it is beneficial to improve the deviation problem of double-sided coating and increase the production yield of the electrode plates.

The embodiments of the present application provide an electric apparatus. An electrode plate in the electric apparatus is manufactured by a deviation-correcting method for double-sided coating. The electric apparatus may be but not limited to a mobile phone, a tablet computer, a notebook computer, an electric toy, an electric tool, an electro mobile, an electric automobile, a ship, an aircraft and the like. The electric toy may include a fixed or mobile electric toy, for example, a game machine, an electric automobile toy, an electric ship toy and an electric airplane toy. The aircraft may include an airplane, a rocket, an aerospace plane and a spacecraft.

A battery cell includes an electrode assembly and electrolyte. The electrode assembly includes a positive electrode plate, a negative electrode plate and an isolating membrane. The battery cell mainly relies on the movement of metal ions between the positive electrode plate and the negative electrode plate to work. The positive electrode plate includes a positive electrode current collector and a positive electrode active substance layer. A surface of the positive electrode current collector is coated with the positive electrode active substance layer. The current collector which is not coated with the positive electrode active substance layer is protruded on the current collector which is coated with the positive electrode active substance layer. The current collector which is not coated with the positive electrode active substance layer may serve as a positive electrode tab. Taking a lithium ion battery as an example, a material of the positive electrode current collector may be aluminum, and the positive active substance may be lithium cobaltate, lithium iron phosphate, ternary lithium or lithium manganate. The negative electrode plate includes a negative electrode current collector and a negative electrode active substance layer. A surface of the negative electrode current collector is coated with the negative electrode active substance layer. The current collector which is not coated with the negative electrode active substance layer is protruded on the current collector which is coated with the negative electrode active substance layer. The current collector which is not coated with the negative electrode active substance layer may serve as a negative electrode tab. A material of the negative electrode current collector may be copper, and the negative electrode active substance may be carbon or silicon.

FIG. 1 is a schematic flowchart of a deviation-correcting method for double-sided coating according to an embodiment of the present application.

Step 101: acquire a first distance between an edge of a coating area on a first surface of an electrode plate substrate and an edge of the electrode plate substrate from a deviation-correcting cross section, where the deviation-correcting cross section is perpendicular to a plane of the electrode plate substrate in a width direction of the electrode plate substrate.

The deviation-correcting cross section refers to a cross section of an electrode plate substrate. The deviation-correcting cross section may be perpendicular to a plane of the electrode plate substrate in a width direction of the electrode plate substrate.

The electrode plate may include a positive electrode plate and a negative electrode plate. The electrode plate substrate may include a positive electrode current collector and a negative electrode current collector.

The edge of the electrode plate substrate refers to an edge of the electrode plate substrate in a length direction, and may be any one side or both sides of the electrode plate substrate in the length direction, which is not limited in this embodiment.

The first surface refers to one of surfaces, coated with the active substance layer, of the electrode plate substrate. The first surface may be a positive side of the electrode plate substrate, or may be a back side of the electrode plate substrate, which is not limited in this embodiment. The second surface refers to one side, corresponding to the first surface, of the electrode plate substrate.

The coating area refers to an area which is coated with the active substance layer. The edge of the coating area refers to an edge in a length direction of the coating area, and may be one side of the coating area in the length direction, which is not limited in this embodiment.

The first distance refers to a distance from the edges of two sides of the coating area on the first surface to the width direction of the edge of one side of the electrode plate substrate.

Step 102: acquire a second distance between an edge of a coating area on a second surface of the electrode plate substrate and the edge of the electrode plate substrate from the deviation-correcting cross section, where the edge of the coating area on the second surface is in one-to-one correspondence with the edge of the coating area on the first surface.

The second distance refers to a distance from the edges of two sides of the coating area on the second surface to the width direction of the edge of one side of the electrode plate substrate. Optionally, the second distance and the first distance are determined, and the edge of the same side of the electrode plate substrate is selected.

Acquiring the first distance from the edge of the coating area on the first surface of the electrode plate substrate to the edge of the electrode plate substrate on the deviation-correcting cross section, and acquiring the second distance from the edge of the coating area on the second surface of the electrode plate substrate to the edge of the electrode plate substrate may be: acquiring the lengths of the first distance and the second distance on the deviation-correcting cross section on the deviation-correcting cross section in real time according to an imaging apparatus, or may be: acquiring the lengths of the first distance and the second distance on the deviation-correcting cross section according to manual measurement after shutdown. The specific acquiring method is not limited in this embodiment.

Step 103: determine edge deviation information of the coating areas according to the first distance and the second distance.

Figure 2:
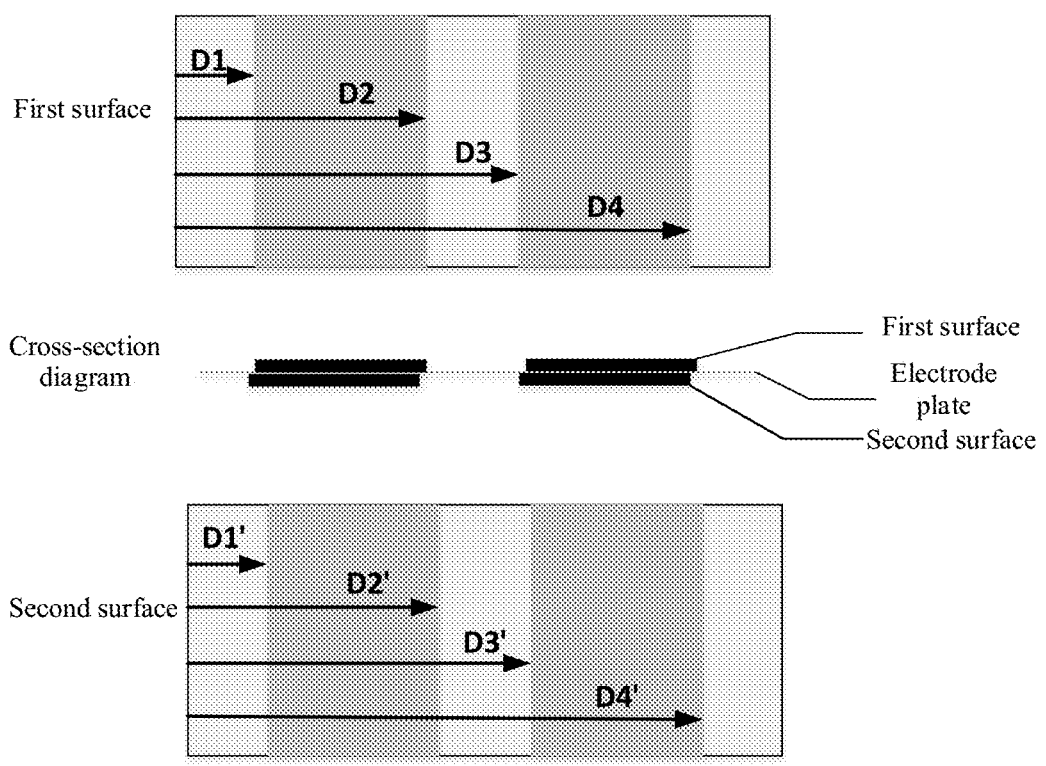
FIG. 2 is a schematic diagram of double-sided coating according to an embodiment of the present application.

The edge deviation information of the coating areas refers to a deviation quantity between the edge of each coating area of the first surface and the edge of each coating area of the corresponding second surface. The distance from the edge of each coating area of the first surface to the edge of the electrode plate substrate may be expressed as $D_1, D_2, \ldots,$ and $_n$. The distance from the edge of each coating area of the second surface to the edge of the electrode plate substrate may be expressed as $D_1', D_2', \ldots,$ and $D_n'$. The edge deviation information of the coating areas may be expressed as $W_1=D_1-D_1'$, $W_2=D_2-D_2'$, and $W_n={}^\circ D_n-D_n'$. FIG. 2 is a situation schematic diagram of an optional embodiment in which a first surface has two coating areas and a second surface has two corresponding coating areas.

Step 104: determine a first deviation-adjusting range according to the edge deviation information of the coating areas and a first deviation-correcting range.

The first deviation-correcting range refers to an allowable electrode plate coating deviation range in the production and manufacturing of a power battery. The deviation range may be a national standard, or may be a company standard, an industrial standard and the allowable maximum misalignment quantity of the electrode plate double-sided coating in the production and manufacturing of the battery, which is not limited in this embodiment.

The first deviation-adjusting range refers to a range where it is necessary to perform deviation-correcting adjustment on the electrode plate substrate so as to adjust the edge deviation information of the coating areas to be within a first deviation-correcting range. For example, the edge deviation information of the coating areas is $W_1=D_1-D_1', \ldots,$ and $W_n=D_n-D_n'$. In a case that the required first deviation-correcting range is (−0.8, 0.8)(unit: mm), the deviation-adjusting range may be expressed as Range (1)∈(−0.8−$W_1$, 0.8+$W_1$), …, and Range (n)∈(−0.8−$W_n$, 0.8+$W_n$), (unit: mm).

Step 105: in a case that a first intersection is present in the first deviation-correcting range, determine a deviation-correcting quantity of the electrode plate substrate according to the first intersection.

The first intersection refers to an intersection of the first deviation-adjusting range. In a case that the electrode plate has only one coating area, the first intersection may be the first deviation-adjusting range.

The deviation-correcting quantity of the electrode plate substrate refers to a distance to be adjusted in a width direction of the electrode plate substrate. The deviation-correcting quantity of the electrode plate substrate meets the intersection of the deviation-adjusting range. The deviation-correcting quantity of the electrode plate substrate may be an endpoint value, an arbitrary value, a determined value and the like within the intersection of the deviation-adjusting range, which is not limited in this embodiment. Optionally, the deviation-correcting quantity may be taken according to a certain ratio interval within the intersection of the deviation-adjusting range, for example, the value interval ratio of the deviation-correcting quantity may be 0.05 mm, which is not limited in this embodiment.

A deviation-correcting direction of the electrode plate substrate refers to deviation-correcting adjustment in the width direction of the electrode plate substrate. The first distance is determined according to a distance from the edge of one side of the electrode plate substrate to two sides of the coating area. In a case that the deviation-correcting quantity is a positive number, deviation is corrected in a direction where the edge of the coating area is away from the edge of the electrode plate substrate on the side. In a case that the deviation-correcting quantity is a positive number, deviation is corrected in a direction where the edge of the coating area is close to the edge of the electrode plate substrate on the side.

In the embodiments of the present application, the edge deviation information of the coating areas is determined by acquiring the first distance from the edge of the coating area on the first surface of the electrode plate substrate to the edge of the electrode plate substrate and the second distance from the edge of the coating area on the second surface of the electrode plate substrate to the edge of the electrode plate substrate; the deviation-adjusting range is determined in combination with the first deviation-correcting range; and the deviation-correcting quantity of the electrode plate substrate is determined according to the intersection of the deviation-adjusting range. Therefore, the edge deviation information of the coating areas can meet the standard requirement after deviation-correcting adjustment.

Figure 3:
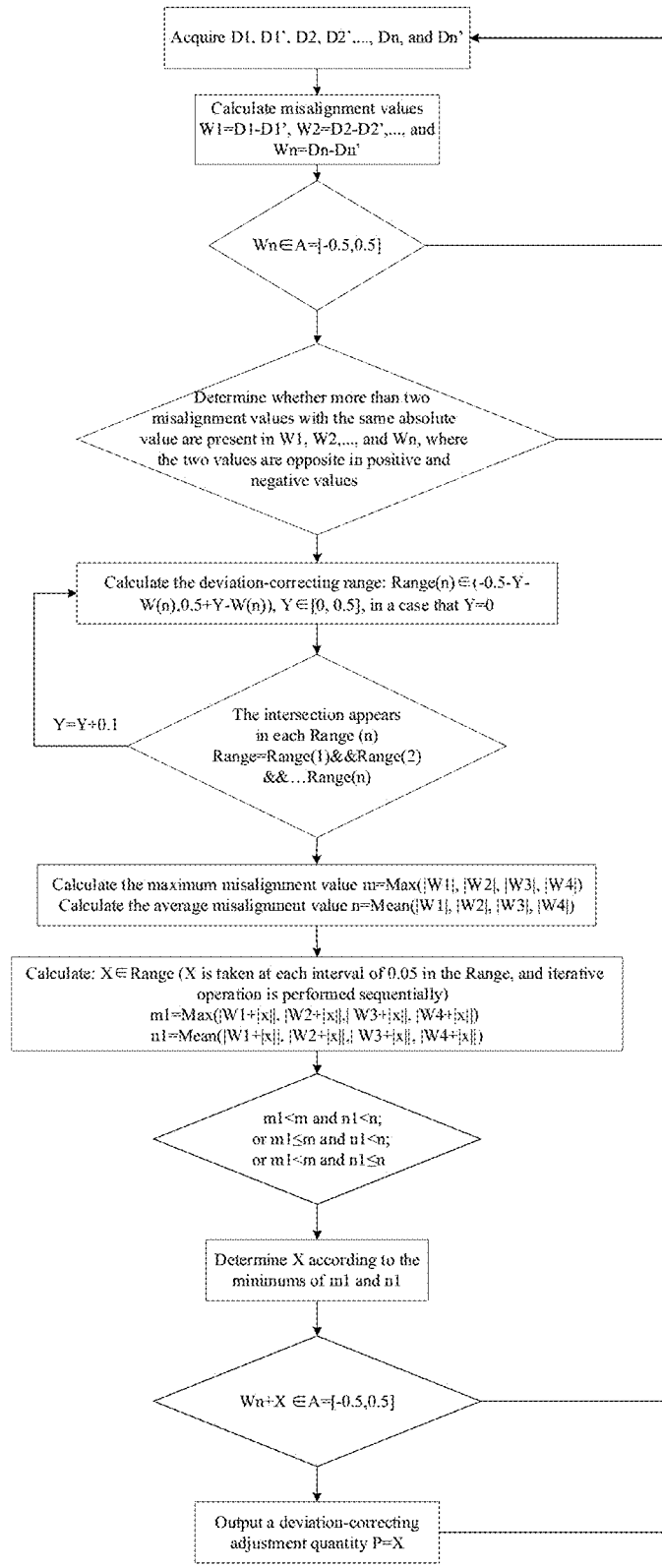
FIG. 3 is a schematic flowchart of a deviation-correcting method for double-sided coating according to an embodiment of the present application.

FIG. 3 is a schematic flowchart of a deviation-correcting method for double-sided coating according to an embodiment of the present application. The steps in the embodiments of the present application similar to the above embodiments may be referenced to the above embodiments. For brevity, details are not repeated herein again.

In some embodiments of the present application, optionally, in a case that a first intersection is present in the first deviation-correcting range, determining a deviation-correcting quantity of the electrode plate substrate according to the first intersection includes:

in a case that an intersection is not present in the first deviation-adjusting range, a second deviation-adjusting range is determined according to the edge deviation information of the coating areas and a second deviation-correcting range. In a case that a second intersection is present in the second deviation-adjusting range, the deviation-correcting quantity of the electrode plate substrate is determined according to the second intersection, where the second deviation-correcting range is greater than the first deviation-correcting range.

Optionally, in a case that the second intersection is not present in the second deviation-adjusting range, a third deviation-adjusting range is determined according to the edge deviation information of the coating areas and a third deviation-correcting range. In a case that a third intersection is present in the third deviation-adjusting range, the deviation-correcting quantity of the electrode plate substrate is determined according to the third intersection, where the third deviation-correcting range is greater than the second deviation-correcting range.

Optionally, in a case that the third intersection is not present in the third deviation-adjusting range, a fourth deviation-adjusting range is determined according to the edge deviation information of the coating areas and a fourth deviation-correcting range. In a case that a fourth intersection is present in the fourth deviation-adjusting range, the deviation-correcting quantity of the electrode plate substrate is determined according to the fourth intersection, where the fourth deviation-correcting range is greater than the third deviation-correcting range.

Optionally, in a case that the third intersection is not present in the fourth deviation-adjusting range, a fifth deviation-adjusting range is determined according to the edge deviation information of the coating areas and a fifth deviation-correcting range. In a case that a fifth intersection is present in the fifth deviation-adjusting range, the deviation-correcting quantity of the electrode plate substrate is determined according to the fifth intersection, where the fifth deviation-correcting range is greater than the fourth deviation-correcting range.

Optionally, the first deviation-correcting range may be gradually expanded to an $n^{th}$ deviation-correcting range until an $n^{th}$ intersection appears in an $n^{th}$ deviation-adjusting range. The deviation-correcting quantity of the electrode plate substrate is determined according to the $n^{th}$ intersection, where n is a positive integer.

Optionally, in the process of gradually expanding the first deviation-correcting range to the $n^{th}$ deviation-correcting range, the size of each expansion of the deviation-correcting range may be 0.1 mm, 0.2 mm or 0.3 mm, which is not limited in this embodiment. For example, the first deviation-correcting range may be expanded by 0.1 mm at each time, then the first deviation-correcting range is (−0.7, 0.7), the second deviation-correcting range is (−0.8, 0.8), and the third deviation-correcting range is (−0.9, 0.9), where the unit is millimeter.

Optionally, the first deviation-correcting range is gradually expanded to the ne deviation-correcting range, and the $n^{th}$ deviation-correcting range does not exceed [−2, 2], where the unit is millimeter. The $n^{th}$ deviation-correcting range is limited not to exceed [−2, 2], so that the misalignment quantity between the adjusted first distance and the second distance still can meet the lowest manufacturing standard requirement. The lowest manufacturing standard may include the allowable maximum misalignment quantity of the electrode plate substrate in the production and manufacturing of a battery.

In the embodiments of the present application, in a case that the intersection is not present in the first deviation-adjusting range, the deviation-correcting quantity of the electrode plate substrate is determined according to the $n^{th}$ intersection, so that the misalignment quantity between the first distance and the second distance can be reduced.

In some embodiments of the present application, optionally, determining a deviation-correcting quantity of the electrode plate substrate according to the first intersection includes:

first deviation information is determined according to the edge deviation information of the coating area, where the first deviation information includes a first deviation quantity and a first average deviation quantity;

second deviation information is determined according to the edge deviation information of the coating areas and an alternative deviation-correcting quantity, where the alternative deviation-correcting quantity meets the intersection of the deviation-adjusting range, and the second deviation information includes a second deviation quantity and a second average deviation quantity.

The deviation-correcting quantity of the electrode plate substrate is determined according to the first deviation information and the second deviation information.

The first deviation quantity refers to the initial maximum edge deviation information of the coating area m. The first average deviation quantity refers to the initial average edge deviation information of the coating area n. The second deviation refers to the maximum edge deviation information of the coating areas obtained after the edge deviation information of the coating areas is adjusted according to the intersection of the deviation-adjusting range $m_1$. The second average deviation refers to the average deviation information of the coating area obtained after the edge deviation information of the coating areas is adjusted according to the intersection of the deviation-adjusting range $n_1$.

The first deviation quantity may be expressed as: m=Max($|W_1|, |W_2|, \ldots, |W_n|$), that is, the maximum of the absolute value of the edge deviation information. The first average deviation quantity may be expressed as: n=Mean($|W_1|, |W_2|, \ldots, |W_n|$), that is, the average value of the absolute value of the edge deviation information.

The second deviation quantity may be expressed as: $m_1$=Max($|W_1+x|, |W_2+x|, \ldots, |W_n+x|$). The second average deviation quantity may be expressed as: $n_1$=Mean($|W_1+x|, |W_2+x|, \ldots, |W_n+x|$). x refers to the alternative deviation-correcting quantity, x meets the intersection of the deviation-adjusting range, and x may be taken according to a certain ratio interval within the intersection of the deviation-adjusting range. The interval ratio value of x may be related to the deviation-correcting precision, for example, the interval ratio value of x may be 0.05 mm. Then, iterative calculation is performed sequentially to acquire the values of the corresponding $m_1$ and $n_1$. For example, in a case that the intersection of the determined deviation-adjusting range is [−0.2 mm, 0.1 mm], the value of x may be −0.2, −0.15, −0.1, −0.05, 0, 0.05 and 0.1 (unit: mm).

Determining the deviation-correcting quantity of the electrode plate substrate according to the first deviation information and the second deviation information refers to: selecting one group of $m_1$ and $n_1$ that are closest to zero from the values of the obtained multiple groups $m_1$ and $n_1$, then determining the value of x of the group $m_1$ and $n_1$ as the deviation-correcting quantity of the electrode plate substrate.

In the embodiments of the present application, one group of $m_1$ and $n_1$ that are closest to zero are selected from the values of the obtained multiple groups $m_1$ and $n_1$, so that the deviation-correcting result can be further optimized.

In some embodiments of the present application, optionally, determining a deviation-correcting quantity of the electrode plate substrate according to the first deviation information and the second deviation information includes:
  in a case that the first deviation information and the second deviation information meet one or more of the following preset conditions:
  the second deviation quantity is less than the first deviation quantity, and the second average deviation quantity is less than the first average deviation quantity;
  the second deviation quantity is less than or equal to the first deviation quantity, and the second average deviation quantity is less than the first average deviation quantity; and
  the second deviation quantity is less than the first deviation quantity, and the second average deviation quantity is less than or equal to the first average deviation quantity,
  the deviation-correcting quantity of the electrode plate substrate is determined according to the first deviation information and the second deviation information.

The first deviation information and the second deviation information include at least one of the following preset conditions: $m_1<m$ and $n_1<n$; $m_1 \leq m$ and $n_1<n$; $m_1<m$ and $n_1 \leq n$.

Determining the deviation-correcting quantity according to the first deviation information and the second deviation information refers to: in all $m_1$, $n_1$ meeting the preset conditions, determining one group of $m_1$ and $n_1$ that are closest to zero. Then, the value of the alternative deviation-correcting quantity x of the group $m_1$ and $n_1$ is determined as the deviation-correcting quantity of the electrode plate substrate.

For example, in a case that the electrode plate substrate has two coating areas, it is assumed that the determined edge deviation information of the coating areas is $W_1=0.8$, $W_2=-0.2$, $W_3=0.3$, $W_4=-0.4$.

In a case that the first deviation-correcting range is [−0.8,0.8], the deviation-adjusting range is:

$W_1 \rightarrow$ Range1: [−1.6,0], $W_2 \rightarrow$ Range2: [−0.6,1], $W_3 \rightarrow$ Range3: [−1.1,0.5], $W_4 \rightarrow$ Range1: [−1.6,0].

The intersection of the deviation-adjusting range may be obtained as: Range=[−0.4,0]. Then, the value of a second coefficient x may be −0.4, −0.35, −0.3, −0.25, −0.2, −0.15, −0.1−0.05 and 0.

$m=\mathrm{Max}(|W_1|,|W_2|,|W_3|,|W_4|)=\mathrm{Max}(0.8,0.2,0.3,0.4)=0.8;$ $n=\mathrm{Mean}(|W_1|,|W_2|,|W_3|,|W_4|)=\mathrm{Mean}(0.8,0.2,0.3,0.4)=(0.8+0.2+0.3+0.4)/4=0.425;$ In a case that the value of x is −0.4, $m_1=\mathrm{Max}(|W_1+x|,|W_2+x|,|W_3+x|,|W_4+x|)=\mathrm{Max}(0.4,0.6,0.1,0.8)=0.8$ $n_1=\mathrm{Mean}(|W_1+x|,|W_2+x|,|W_3+x|,|W_4+x|)=\mathrm{Mean}(0.4,0.6,0.1,0.8)=(0.4+0.6+0.1+0.8)/4=0.475$ In a case that the value of x is −0.4, $m_1=m$, $n_1>n$, the preset condition is not met.

Similarly, in a case that the value of x is −0.35, $m_1=0.75$, $n_1=0.45$, $m_1<m$, $n_1>n$, the preset condition is not met.

Similarly, in a case that the value of x is −0.3, $m_1=0.7$, $n_1=0.425$, $m_1<m$, $n_1=n$, the preset condition is met.

Similarly, in a case that the value of x is −0.25, $m_1=0.65$, $n_1=0.425$, $m_1<m$, $n_j=n$, the preset condition is met.

Similarly, in a case that the value of x is −0.2, $m_1=0.6$, $n_1=0.425$, $m_1<m$, $n_j=n$, the preset condition is met.

Similarly, in a case that the value of x is −0.15, $m_1=0.65$, $n_1=0.425$, $m_1<m$, $n_j=n$, the preset condition is met.

Similarly, in a case that the value of x is −0.1, $m_1=0.7$, $n_1=0.425$, $m_1<m$, $n_j=n$, the preset condition is met.

Similarly, in a case that the value of x is −0.05, $m_1=0.75$, $n_1=0.425$, $m_t<m$, $n_j=n$, the preset condition is met.

Similarly, in a case that the value of x is 0, $m_1=0.8$, $n_1=0.425$, $m_1=m$, $n_j=n$, the preset condition is not met.

In conclusion, in a case that the value of x is −0.2, $m_2=0.6$, $n_1=0.425$, $m_1$ and $n_1$ are one group of $m_1$ and $n_1$ that are closest to zero, and the deviation-correcting quantity of the electrode plate substrate is −0.2.

In the embodiments of the present application, the preset conditions are set, so that it may be determined whether the deviation-correcting results of the alternative deviation-correcting quantity that meets the intersection of the deviation-adjusting range are improved, and the deviation-correcting quantity with the good deviation-correcting result is selected therefrom.

In some embodiments of the present application, optionally, determining a deviation-correcting quantity of the electrode plate substrate according to the first intersection includes:
  a deviation quantity between the first distance and the second distance is determined according to the edge deviation information of the coating areas and the deviation-correcting quantity of the electrode plate substrate. In a case that the deviation quantity between the first distance and the second distance meets the first deviation-correcting range, the deviation-correcting quantity of the electrode plate substrate is determined as the deviation-correcting quantity.

Determining the deviation quantity between the first distance and the second distance according to the edge deviation information of the coating areas and the deviation-correcting quantity of the electrode plate substrate refers to: combining the determined deviation-correcting quantity of the electrode plate substrate with the edge deviation information of the coating area; determining the edge deviation information of the coating areas after the determined deviation-correcting quantity of the electrode plate substrate is adjusted, that is, the deviation quantity between the first distance and the second distance; determining whether the deviation quantity meets the first deviation-correcting range; and in a case that the deviation quantity meets the first deviation-correcting range, determining the deviation-correcting quantity of the electrode plate substrate as the deviation-correcting quantity.

In the embodiments of the present application, after the electrode plate substrate is adjusted through the determined deviation-correcting quantity, the deviation quantity between the first distance and the second distance of the coating areas may meet the standard-allowable deviation range.

In some embodiments of the present application, optionally, determining a first deviation-adjusting range according to the edge deviation information of the coating areas and a first deviation-correcting range includes:

in a case that the edge deviation information of the coating areas does not meet the first deviation-correcting range, the first deviation-adjusting range is determined according to the edge deviation information of the coating areas and the first deviation-correcting range.

In the embodiments of the present application, in case that the edge deviation information of the coating areas does not meet the first deviation-correcting range, it is considered that the deviation quantity between the first distance and the second distance exceeds the standard-allowable range, so it is necessary to perform deviation-correcting adjustment on the electrode plate substrate.

Figure 4:
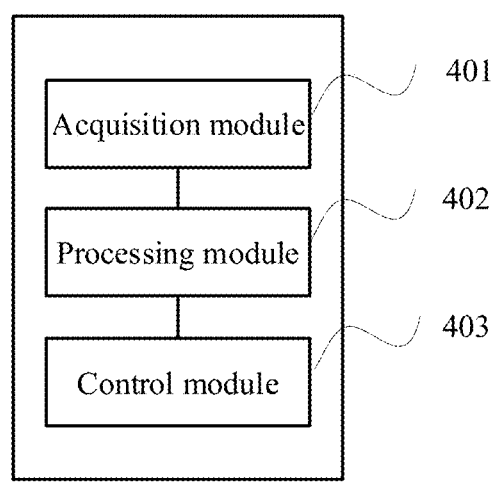
FIG. 4 is a schematic block diagram of a deviation-correcting apparatus for double-sided coating according to another embodiment of the present application.

FIG. 4 is a schematic block diagram of a deviation-correcting apparatus for double-sided coating according to another embodiment of the present application. In the embodiments of the present application, the deviation-correcting apparatus for double-sided coating may include an acquisition module 401, a processing module 402 and a control module 403. The steps in the embodiments of the present application similar to the above embodiments may be referenced to the above embodiments. For brevity, details are not repeated herein again.

An acquisition module 401 is configured to: acquire a first distance between an edge of a coating area on a first surface of an electrode plate substrate and an edge of the electrode plate substrate from a deviation-correcting cross section, where the deviation-correcting cross section is perpendicular to a plane of the electrode plate substrate in a width direction of the electrode plate substrate; and acquire a second distance between an edge of a coating area on a second surface of the electrode plate substrate and the edge of the electrode plate substrate from the deviation-correcting cross section, where the edge of the coating area on the second surface is in one-to-one correspondence with the edge of the coating area on the first surface.

A processing module 402 is configured to: determine edge deviation information of the coating areas according to the first distance and the second distance; determine a first deviation-adjusting range according to the edge deviation information of the coating areas and a first deviation-correcting range; and in a case that a first intersection is present in the first deviation-adjusting range, determine a deviation-correcting quantity of the electrode plate substrate according to the first intersection.

A control module 403 is configured to control a deviation-correcting distance of the electrode plate substrate according to the deviation-correcting quantity of the electrode plate substrate.

In the embodiments of the present application, the first distance from the edge of the coating area on the first surface of the electrode plate substrate to the edge of the electrode plate substrate and the second distance from the edge of the coating area on the second surface of the electrode plate substrate to the edge of the electrode plate substrate are obtained through the acquisition module 401. The processing module 402 determines the edge deviation information of the coating areas and determines the deviation-adjusting range in combination with the first deviation-correcting range. The deviation-correcting quantity of the electrode plate substrate determined by the processing module 402 through the intersection of the deviation-adjusting range can make the edge deviation information of the coating areas meet the standard requirement after deviation-correcting adjustment by the control module 403.

In some embodiments of the present application, optionally, the processing module 402 is further configured to: in a case that a first intersection is present in the first deviation-correcting range, determine a deviation-correcting quantity of the electrode plate substrate according to the first intersection, including:

the processing module 402 is configured to: in a case that an intersection is not present in the first deviation-adjusting range, determine a second deviation-adjusting range according to the edge deviation information of the coating areas and a second deviation-correcting range; and in a case that a second intersection is present in the second deviation-adjusting range, determine the deviation-correcting quantity of the electrode plate substrate according to the second intersection, where the second deviation-correcting range is greater than the first deviation-correcting range.

Optionally, in a case that the second intersection is not present in the second deviation-adjusting range, the processing module 402 determines a third deviation-adjusting range according to the edge deviation information of the coating areas and a third deviation-correcting range. In a case that a third intersection is present in the third deviation-adjusting range, the deviation-correcting quantity of the electrode plate substrate is determined according to the third intersection, where the third deviation-correcting range is greater than the second deviation-correcting range.

Optionally, in a case that a third intersection is not present in the third deviation-adjusting range, the processing module 402 determines a fourth deviation-adjusting range according to the edge deviation information of the coating areas and a fourth deviation-correcting range. In a case that a fourth intersection is present in the fourth deviation-adjusting range, the deviation-correcting quantity of the electrode plate substrate is determined according to the fourth intersection, where the fourth deviation-correcting range is greater than the third deviation-correcting range.

Optionally, in a case that a third intersection is not present in the fourth deviation-adjusting range, the processing module 402 determines a fifth deviation-adjusting range according to the edge deviation information of the coating areas and a fifth deviation-correcting range. In a case that a fifth intersection is present in the fifth deviation-adjusting range, the deviation-correcting quantity of the electrode plate substrate is determined according to the fifth intersection, where the fifth deviation-correcting range is greater than the fourth deviation-correcting range.

Optionally, the processing module 402 may gradually expand the first deviation-correcting range to an $n^{th}$ deviation-correcting range until an $n^{th}$ intersection appears in an $n^{th}$ deviation-adjusting range. The processing module 402 determines the deviation-correcting quantity of the electrode plate substrate according to the $n^{th}$ intersection, where n is a positive integer.

Optionally, in the process of gradually expanding the first deviation-correcting range to the $n^{th}$ deviation-correcting range by the processing module 402, the size of each expansion of the deviation-correcting range may be 0.1 mm, 0.2 mm or 0.3 mm, which is not limited in this embodiment. For example, the processing module 402 may expand the first deviation-correcting range by 0.1 mm at each time, then the first deviation-correcting range is (−0.7, 0.7), the second deviation-correcting range is (−0.8, 0.8), and the third deviation-correcting range is (−0.9, 0.9), where the unit is millimeter.

Optionally, the processing module 402 may gradually expand the first deviation-correcting range to the $n^{th}$ deviation-correcting range, and the $n^{th}$ deviation-correcting range does not exceed [−2, 2], where the unit is millimeter.

In the embodiments of the present application, in a case that an intersection is not present in a first deviation-adjusting range, the processing module 402 determines a deviation-correcting quantity of the electrode plate substrate according to a second intersection, so that a misalignment quantity between the first distance and the second distance can be reduced.

In some embodiments of the present application, optionally, the processing module 402 is further configured to: determine a deviation-correcting quantity of the electrode plate substrate according to the first intersection, including:
  the processing module 402 is further configured to determine first deviation information according to the edge deviation information of the coating area, where the first deviation information includes a first deviation quantity and a first average deviation quantity;
  determine second deviation information according to the edge deviation information of the coating areas and an alternative deviation-correcting quantity, where the alternative deviation-correcting quantity meets the intersection of the deviation-adjusting range, and the second deviation information includes a second deviation quantity and a second average deviation quantity; and
  determine the deviation-correcting quantity of the electrode plate substrate according to the first deviation information and the second deviation information.

That the processing module 402 determines the deviation-correcting quantity of the electrode plate substrate according to the first deviation information and the second deviation information refers to: the processing module 402 selects one group of $m_1$ and $n_1$ that are closest to zero from the values of the obtained multiple groups $m_1$ and $n_1$, then the processing module 402 determines the value of x of the group $m_1$ and $n_1$ as the deviation-correcting quantity of the electrode plate substrate.

In the embodiments of the present application, the processing module 402 selects one group of $m_1$ and $n_1$ that are closest to zero from the values of the obtained multiple groups $m_1$ and $n_1$, so that the deviation-correcting result can be further optimized.

In some embodiments of the present application, optionally, the processing module 402 is further configured to: determine a deviation-correcting quantity of the electrode plate substrate according to the first deviation information and the second deviation information, including:
  in a case that the first deviation information and the second deviation information meet one or more of the following preset conditions:
  the second deviation quantity is less than the first deviation quantity, and the second average deviation quantity is less than the first average deviation quantity;
  the second deviation quantity is less than or equal to the first deviation quantity, and the second average deviation quantity is less than the first average deviation quantity; and
  the second deviation quantity is less than the first deviation quantity, and the second average deviation quantity is less than or equal to the first average deviation quantity,
  the processing module 402 determines the deviation-correcting quantity of the electrode plate substrate according to the first deviation information and the second deviation information.

That the processing module 402 determines the first deviation information and the second deviation information includes at least one of the following preset conditions: $m_1 < m$ and $n_1 < n$; $m_1 \leq m$ and $n_1 < n$; $m_1 < m$ and $n_1 \leq n$.

That the processing module 402 determines the deviation-correcting quantity according to the first deviation information and the second deviation information refers to: in all $m_1$ and $n_1$ meeting the preset conditions, the processing module 402 determines one group of $m_1$ and $n_1$ that are closest to zero. Then, the processing module 402 determines the value of x of the group $m_1$ and $n_1$ as the deviation-correcting quantity of the electrode plate substrate.

In the embodiments of the present application, the processing module 402 sets the preset conditions, so that it may be determined whether the deviation-correcting results of the alternative deviation-correcting quantity that meets the intersection of the deviation-adjusting range are improved, and the deviation-correcting quantity with the good deviation-correcting result is selected therefrom.

In some embodiments of the present application, optionally, the processing module 402 is further configured to: determine a deviation-correcting quantity of the electrode plate substrate according to the first intersection, including:
  the processing module 402 is configured to determine a deviation quantity between the first distance and the second distance according to the edge deviation information of the coating areas and the deviation-correcting quantity of the electrode plate substrate; and
  in a case that the deviation quantity between the first distance and the second distance meets the first deviation-correcting range, determine the deviation-correcting quantity of the electrode plate substrate as the deviation-correcting quantity.

That the processing module 402 determines the deviation quantity between the first distance and the second distance according to the edge deviation information of the coating areas and the deviation-correcting quantity of the electrode plate substrate refers to: the processing module 402 combines the determined deviation-correcting quantity of the electrode plate substrate with the edge deviation information of the coating area; the processing module 402 determines the edge deviation information of the coating areas after the determined deviation-correcting quantity of the electrode plate substrate is adjusted, that is, the deviation quantity between the first distance and the second distance; and the processing module 402 determines whether the deviation quantity meets the first deviation-correcting range; and in a case that the deviation quantity meets the first deviation-correcting range, the deviation-correcting quantity of the electrode plate substrate is determined as the deviation-correcting quantity. The control module 403 performs deviation-correcting adjustment on the electrode plate substrate according to the deviation-correcting quantity.

In the embodiments of the present application, the control module 403 performs deviation-correcting adjustment on the electrode plate substrate according to the deviation-correcting quantity, so that the deviation quantity between the first distance and the second distance of the coating area after adjustment can meet the standard-allowable deviation range.

In some embodiments of the present application, optionally, the processing module 402 is further configured to: determine a first deviation-adjusting range according to the edge deviation information of the coating areas and a first deviation-correcting range, including:

in a case that the edge deviation information of the coating areas does not meet the first deviation-correcting range, the processing module 402 determines the first deviation-adjusting range according to the edge deviation information of the coating areas and the first deviation-correcting range.

In the embodiments of the present application, in a case that the edge deviation information of the coating areas does not meet the first deviation-correcting range, the processing module 402 considers that the deviation quantity between the first distance and the second distance exceeds the standard-permissible range, so it is necessary to perform deviation-correcting adjustment on the electrode plate substrate.

The embodiments of the present application further provide another deviation-correcting apparatus for double-sided coating. The apparatus includes a memory and a processor, where the memory is configured to store an instruction; and the processor is configured to read the instruction and perform the method according to various embodiments of the present application based on the instruction.

The embodiments of the present application further provide a readable storage medium for storing a computer program. The computer program is used to perform the method according to various embodiments of the present application.

The embodiments of the present application further provide a deviation-correcting mechanism for double-sided coating, including the deviation-correcting apparatus for double-sided coating according to above embodiments of the present application.

Although the present application has been described with reference to preferred embodiments, various improvements can be made thereto and equivalents can be used for replacement of members therein without departing from the scope of the present application. In particular, as long as there is no structural conflict, the technical features in the embodiments can be combined in any way. The present application is not restricted to particular embodiments disclosed herein, but includes all technical solutions falling in the scope of the claims.

What is claimed is:

1. A deviation-correcting method for double-sided coating, comprising:
    acquiring a first distance between an edge of a coating area on a first surface of an electrode plate substrate and an edge of the electrode plate substrate from a deviation-correcting cross section, wherein the deviation-correcting cross section is perpendicular to a plane of the electrode plate substrate in a width direction of the electrode plate substrate;
    acquiring a second distance between an edge of a coating area on a second surface of the electrode plate substrate and the edge of the electrode plate substrate from the deviation-correcting cross section, wherein the edge of the coating area on the second surface is in one-to-one correspondence with the edge of the coating area on the first surface;
    determining edge deviation information of the coating areas according to the first distance and the second distance;
    determining a first deviation-adjusting range according to the edge deviation information of the coating areas and a first deviation-correcting range; and
    in a case that a first intersection is present in the first deviation-adjusting range, determining a deviation-correcting quantity of the electrode plate substrate according to the first intersection.

2. The method according to claim 1, wherein determining the deviation-correcting quantity of the electrode plate substrate according to the first intersection comprises:
    in a case that an intersection is not present in the first deviation-adjusting range, determining a second deviation-adjusting range according to the edge deviation information of the coating areas and a second deviation-correcting range; and
    in a case that a second intersection is present in the second deviation-adjusting range, determining a deviation-correcting quantity of the electrode plate substrate according to the second intersection, the second deviation-correcting range being larger than the first deviation-correcting range.

3. The method according to claim 1, wherein determining the deviation-correcting quantity of the electrode plate substrate according to the first intersection comprises:
    determining first deviation information according to the edge deviation information of the coating areas, the first deviation information comprising a first deviation quantity and a first average deviation quantity;
    determining second deviation information according to the edge deviation information of the coating areas and an alternative deviation-correcting quantity, the alternative deviation-correcting quantity meeting the intersection of the deviation-adjusting range, and the second deviation information comprising a second deviation quantity and a second average deviation quantity; and
    determining the deviation-correcting quantity of the electrode plate substrate according to the first deviation information and the second deviation information.

4. The method according to claim 3, wherein the determining the deviation-correcting quantity of the electrode plate substrate according to the first deviation information and the second deviation information comprises:
    in a case that the first deviation information and the second deviation information meet one or more of preset conditions, determining the deviation-correcting quantity of the electrode plate substrate according to the first deviation information and the second deviation information;
    wherein the preset conditions comprise:
        the second deviation quantity is less than the first deviation quantity, and the second average deviation quantity is less than the first average deviation quantity,
        the second deviation quantity is less than or equal to the first deviation quantity, and the second average deviation quantity is less than the first average deviation quantity, and
        the second deviation quantity is less than the first deviation quantity, and the second average deviation quantity is less than or equal to the first average deviation quantity.

5. The method according to claim 1, wherein determining the deviation-correcting quantity of the electrode plate substrate according to the first intersection comprises:
    determining a deviation quantity between the first distance and the second distance according to the edge deviation information of the coating areas and the deviation-correcting quantity of the electrode plate substrate; and in a case that the deviation quantity between the first distance and the second distance meets the first deviation-correcting range, determining the deviation-correcting quantity of the electrode plate substrate as the deviation-correcting quantity.

6. The method according to claim 1, wherein determining the first deviation-adjusting range according to the edge deviation information of the coating areas and a first deviation-correcting range comprises:

in a case that the edge deviation information of the coating areas does not meet the first deviation-correcting range, determining the first deviation-adjusting range according to the edge deviation information of the coating areas and the first deviation-correcting range.

7. A deviation-correcting apparatus for double-sided coating, comprising:

an acquisition module;
a processing module; and
a control module;

wherein the acquisition module is configured to:
acquire a first distance between an edge of a coating area on a first surface of an electrode plate substrate and an edge of the electrode plate substrate from a deviation-correcting cross section, wherein the deviation-correcting cross section is perpendicular to a plane of the electrode plate substrate in a width direction of the electrode plate substrate; and acquire a second distance between an edge of a coating area on a second surface of the electrode plate substrate and the edge of the electrode plate substrate from the deviation-correcting cross section, wherein the edge of the coating area on the second surface is in one-to-one correspondence with the edge of the coating area on the first surface;

wherein the processing module is configured to:
determine edge deviation information of the coating areas according to the first distance and the second distance;
determine a first deviation-adjusting range according to the edge deviation information of the coating areas and a first deviation-correcting range; and
in a case that a first intersection is present in the first deviation-adjusting range, determine a deviation-correcting quantity of the electrode plate substrate according to the first intersection;

wherein the control module is configured to:
control a deviation-correcting distance of the electrode plate substrate according to the deviation-correcting quantity of the electrode plate substrate.

8. The apparatus according to claim 7, wherein in determining the deviation-correcting quantity of the electrode plate substrate according to the first intersection, the processing module is configured to:

in a case that an intersection is not present in the first deviation-adjusting range, determine a second deviation-adjusting range according to the deviation information of the edges of the coating areas and a second deviation-correcting range, and in a case that a second intersection is present in the second deviation-adjusting range, determine a deviation-correcting quantity of the electrode plate substrate according to the second intersection, the second deviation-correcting range being larger than the first deviation-correcting range.

9. The apparatus according to claim 7, wherein in determining the deviation-correcting quantity of the electrode plate substrate according to the first intersection, the processing module is configured to:

determine first deviation information according to the edge deviation information of the coating area, the first deviation information comprising a first deviation quantity and a first average deviation quantity;

determining second deviation information according to the edge deviation information of the coating areas and an alternative deviation-correcting quantity, the alternative deviation-correcting quantity meeting the intersection of the deviation-adjusting range, and the second deviation information comprising a second deviation quantity and a second average deviation quantity; and determine the deviation-correcting quantity of the electrode plate substrate according to the first deviation information and the second deviation information.

10. The apparatus according to claim 9, wherein in determining the deviation-correcting quantity of the electrode plate substrate according to the first deviation information and the second deviation information, the processing module is configured to:

in a case that the first deviation information and the second deviation information meet one or more of preset conditions, determine the deviation-correcting quantity of the electrode plate substrate according to the first deviation information and the second deviation information;

wherein the preset conditions comprise:
the second deviation quantity is less than the first deviation quantity, and the second average deviation quantity is less than the first average deviation quantity,
the second deviation quantity is less than or equal to the first deviation quantity, and the second average deviation quantity is less than the first average deviation quantity, and
the second deviation quantity is less than the first deviation quantity, and the second average deviation quantity is less than or equal to the first average deviation quantity.

11. The apparatus according to claim 7, wherein in determining the deviation-correcting quantity of the electrode plate substrate according to the first intersection, the processing module is configured to:

determine a deviation quantity between the first distance and the second distance according to the edge deviation information of the coating areas and the deviation-correcting quantity of the electrode plate substrate; and in a case that the deviation quantity between the first distance and the second distance meets the first deviation-correcting range, determine the deviation-correcting quantity of the electrode plate substrate as the deviation-correcting quantity.

12. The apparatus according to claim 7, wherein in determining the first deviation-adjusting range according to the edge deviation information of the coating areas and the first deviation-correcting range, the processing module is configured to:

in a case that the edge deviation information of the coating areas does not meet the first deviation-correcting range, determine the first deviation-adjusting range according to the edge deviation information of the coating areas and the first deviation-correcting range.

13. A deviation-correcting mechanism for double-sided coating, comprising the deviation-correcting apparatus for double-sided coating according to claim 7.

\* \* \* \* \*